(12) United States Patent
Koh et al.

(10) Patent No.: US 12,508,903 B2
(45) Date of Patent: Dec. 30, 2025

(54) MULTI-FUNCTIONAL MANIPULATION APPARATUS AND CONTROL METHOD THEREOF

(71) Applicants: HYUNDAI MOTOR COMPANY, Seoul (KR); KIA CORPORATION, Seoul (KR); LS AUTOMOTIVE TECHNOLOGIES CO., LTD., Anyang-si (KR)

(72) Inventors: Jin Young Koh, Suwon-si (KR); Jun Hwan Lee, Uiwang-si (KR)

(73) Assignees: HYUNDAI MOTOR COMPANY, Seoul (KR); KIA CORPORATION, Seoul (KR); LS AUTOMOTIVE TECHNOLOGIES CO., LTD., Anyang-si (KR)

( * ) Notice: Subject to any disclaimer, the term of this patent is extended or adjusted under 35 U.S.C. 154(b) by 511 days.

(21) Appl. No.: 17/983,194

(22) Filed: Nov. 8, 2022

(65) Prior Publication Data
US 2024/0017617 A1    Jan. 18, 2024

(30) Foreign Application Priority Data

Jul. 13, 2022    (KR) .......................... 10-2022-0086499

(51) Int. Cl.
| | |
|---|---|
| *B60K 35/10* | (2024.01) |
| *B60K 35/21* | (2024.01) |
| *B60K 35/25* | (2024.01) |
| *B60K 35/60* | (2024.01) |
| *B60Q 1/00* | (2006.01) |

(Continued)

(52) U.S. Cl.
CPC ............ *B60K 35/10* (2024.01); *B60K 35/212* (2024.01); *B60K 35/25* (2024.01); *B60K 35/60* (2024.01); *B60Q 1/0076* (2013.01); *B60S 1/0803* (2013.01); *H01H 19/10* (2013.01);
(Continued)

(58) Field of Classification Search
CPC ........ B60K 35/10; B60K 35/00; B60K 35/22; B60K 35/25; B60K 2360/126; B60K 2360/131; B60K 35/212; B60K 35/60; B60Q 1/0076; B60Q 9/00; B60Q 1/1476; B60S 1/0803; H01H 19/10; H01H 21/22;
(Continued)

(56) References Cited

U.S. PATENT DOCUMENTS

| | | | |
|---|---|---|---|
| 8,067,709 B2 | 11/2011 | Han et al. | |
| 2004/0090318 A1* | 5/2004 | Rothkop | ................ B60Q 9/008 340/475 |

(Continued)

FOREIGN PATENT DOCUMENTS

| | | |
|---|---|---|
| CN | 213583612 U | 6/2021 |
| JP | 6329932 B2 | 5/2018 |

(Continued)

*Primary Examiner* — Ahmed M Saeed
(74) *Attorney, Agent, or Firm* — Lempia Summerfield Katz LLC

(57) ABSTRACT

A multi-functional manipulation apparatus and method include a switch that operates by an external force from a neutral position and returns to the neutral position when the external force is removed, a vibrator coupled to the switch to vibrate depending on an operation of the switch, and a controller that controls a vehicle accessory device corresponding to the vibrator and the switch, in response to the operation of the switch.

19 Claims, 25 Drawing Sheets

(51) Int. Cl.
  *B60S 1/08* (2006.01)
  *H01H 19/10* (2006.01)
  *H01H 21/22* (2006.01)
  *B60K 35/22* (2024.01)

(52) U.S. Cl.
  CPC ............ *H01H 21/22* (2013.01); *B60K 35/22* (2024.01); *B60K 2360/126* (2024.01); *B60K 2360/131* (2024.01)

(58) Field of Classification Search
  CPC ..... H01H 21/36; H01H 21/025; B60W 50/14; B60W 50/16; B60W 2050/146
  See application file for complete search history.

(56) References Cited

U.S. PATENT DOCUMENTS

| | | | |
|---|---|---|---|
| 2010/0200375 | A1 | 8/2010 | Han et al. |
| 2017/0123626 | A1 | 5/2017 | Saito et al. |
| 2021/0163061 | A1 | 6/2021 | Schemmel et al. |
| 2023/0074687 | A1* | 3/2023 | Koh .......................... B62J 6/16 |

FOREIGN PATENT DOCUMENTS

| | | |
|---|---|---|
| KR | 200445703 Y1 | 8/2009 |
| KR | 20110057861 A | 6/2011 |
| KR | 101165174 B1 | 7/2012 |
| WO | 2009145543 A2 | 12/2009 |

\* cited by examiner

② COUNTERCLOCKWISE MANIPULATION (b)

(a)

MULTI-FUNCTIONAL MANIPULATION APPARATUS AND CONTROL METHOD THEREOF

CROSS-REFERENCE TO RELATED APPLICATION

This application claims the benefit of priority to Korean Patent Application No. 10-2022-0086499, filed in the Korean Intellectual Property Office on Jul. 13, 2022, the entire contents of which are incorporated herein by reference.

TECHNICAL FIELD

The present disclosure relates to a multi-functional manipulation apparatus and to a control method thereof, and more particularly, relates to a multi-functional manipulation apparatus for easily identifying a manipulation state and to a control method thereof.

BACKGROUND

A multi-functional manipulation apparatus for a vehicle is called a multi-function switch and is a part engaged with a steering column at a lower end of a steering wheel. The multi-function switch is used to control vehicle accessory devices such as headlamps and wipers.

A symbol, an arrow, or the like for notifying a driver of a function and a manipulation state of the switch is printed on an external surface of the multi-function switch or may be engraved into the external surface of the multi-function switch in a concave-convex shape.

Because the function and operation of the multi-function switch differs for each vehicle, the symbol of the multi-function switch should be printed differently in response to the function and operation in each vehicle. In other words, because the multi-function switch should be manufactured differently for each vehicle, it is difficult to manufacture and manage the multi-function switch part variations.

Furthermore, because the symbol printed on the multi-function switch is in a position that is out of line with the direction of the driver's gaze, there is a limitation that a driver intuitively identifies a manipulation state of the multi-function switch.

SUMMARY

The present disclosure has been made to solve the above-mentioned problems occurring in the prior art while maintaining intact advantages achieved by the prior art.

An aspect of the present disclosure provides a multi-functional manipulation apparatus for allowing a driver to more easily identify a manipulation state. Another aspect of the present disclosure provides a control method thereof.

Furthermore, another aspect of the present disclosure provides a multi-functional manipulation apparatus having high compatibility to make it easier to be applied to a vehicle with different specifications. Another aspect of the present disclosure provides a control method thereof.

Furthermore, another aspect of the present disclosure provides a multi-functional manipulation apparatus for allowing a user to more intuitively identify a manipulation state of the apparatus. Another aspect of the present disclosure provides a control method thereof.

The technical problems to be solved by the present disclosure are not limited to the aforementioned problems. Any other technical problems not mentioned herein should be clearly understood from the following description by those of ordinary skill in the art to which the present disclosure pertains.

According to an aspect of the present disclosure, a multi-functional manipulation apparatus may include: a switch that operates by an external force from a neutral position and returns to the neutral position when the external force is removed; a vibrator coupled to the switch to vibrate depending on an operation of the switch; and a controller that controls a vehicle accessory device corresponding to the vibrator and the switch, in response to the operation of the switch.

According to an embodiment, the controller may control the vibrator in a first vibration mode, based on that the switch operates in a first direction, and may control the vibrator in a second vibration mode, based on that the switch operates in a second direction.

According to an embodiment, the controller may adjust vibration magnitudes of the first vibration mode and the second vibration mode to be different.

According to an embodiment, the controller may adjust vibration patterns of the first vibration mode and the second vibration mode to be different.

According to an embodiment, the multi-functional manipulation apparatus may further include a display that displays an operation state of the vehicle accessory device depending on the operation of the switch. The controller may generate image data for notifying a driver of the operation state of the vehicle accessory device, in response to the operation of the switch.

According to an embodiment, the switch may be a lever in a self-return scheme. The lever may be coupled to one side of a steering wheel of the vehicle to control an operation of headlamps or wipers. The controller may differently set an order in which an operation mode of the wipers is changed. The order may be displayed on the display in response to an operation of the lever.

According to an embodiment, the multi-functional manipulation apparatus may further include a knob in the self-return scheme. The knob may be coupled to an end of the lever to change an operation mode of the headlamps or an operation mode of a rear wiper. The controller may differently set an order in which the operation mode of the headlamps is changed or an order in which the operation mode of the wipers is changed. The order may be displayed on the display, depending on a rotation direction of the knob.

According to an embodiment, the controller may set a vibration mode of the vibrator differently, depending on the order in which the operation mode of the headlamps is changed or the order in which the operation mode of the wipers is changed, the order being displayed on the display.

According to an embodiment, the multi-functional manipulation apparatus may further include a protrusion switch in the self-return scheme, the protrusion switch protruding from the lever to control an operation of fog lamps or intermittent wipers. The controller may differently display an order in which an operation mode of the fog lamps is changed or an order in which an operation mode of the intermittent wipers is changed. The order may be displayed on the display, depending on an operation direction of the protrusion switch.

According to an embodiment, the controller may set a vibration mode of the vibrator differently, depending on the order in which the operation mode of the fog lamps is changed or the order in which the operation mode of the intermittent wipers is changed. The order may be displayed on the display.

According to another aspect of the present disclosure, a control method of a multi-functional manipulation apparatus may include: determining an operation of a switch coupled to a steering wheel of a vehicle; controlling a vehicle accessory device corresponding to the switch, in response to the operation of the switch; and controlling a vibrator coupled to the switch, under control of the vehicle accessory device.

According to an embodiment, the controlling of the vibrator coupled to the switch may include controlling the vibrator in a first vibration mode, when the switch operates in a first direction and may include controlling the vibrator in a second vibration mode, when the switch operates in a second direction.

According to an embodiment, the controlling of the vibrator coupled to the switch may include adjusting vibration magnitudes of the first vibration mode and the second vibration mode to be different.

According to an embodiment, the controlling of the vibrator coupled to the switch may include adjusting vibration patterns of the first vibration mode and the second vibration mode to be different.

According to an embodiment, the control method may further include generating image data for notifying a driver of the vehicle of an operation state of the vehicle accessory device, in response to the operation of the switch. The control method may also include displaying the operation state of the vehicle accessory device on a display of the multi-functional manipulation apparatus, based on the image data.

According to an embodiment, the displaying of the operation state of the vehicle accessory device on the display may include differently setting an order in which an operation mode of wipers is changed, based on an operation of a lever coupled to one side of the steering wheel.

According to an embodiment, the displaying of the operation state of the vehicle accessory device on the display may further include differently setting an order in which an operation mode of headlamps is changed or an order in which the operation mode of the wipers is changed, the order being displayed on the display, based on an operation of a knob coupled to an end of the lever.

According to an embodiment, the controlling of the vibrator coupled to the switch may include setting a vibration mode of the vibrator differently, depending on the order in which the operation mode of the headlamps is changed or the order in which the operation mode of the wipers is changed. The order may be displayed on the display.

According to an embodiment, the displaying of the operation state of the vehicle accessory device on the display may include differently displaying an order in which an operation mode of fog lamps is changed or an order in which an operation mode of intermittent wipers is changed. The order may be displayed on the display, based on an operation of a protrusion switch coupled to the lever.

According to an embodiment, the controlling of the vibrator coupled to the switch may include setting a vibration mode of the vibrator differently, depending on the order in which the operation mode of the fog lamps is changed or the order in which the operation mode of the intermittent wipers is changed. The order may be displayed on the display.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
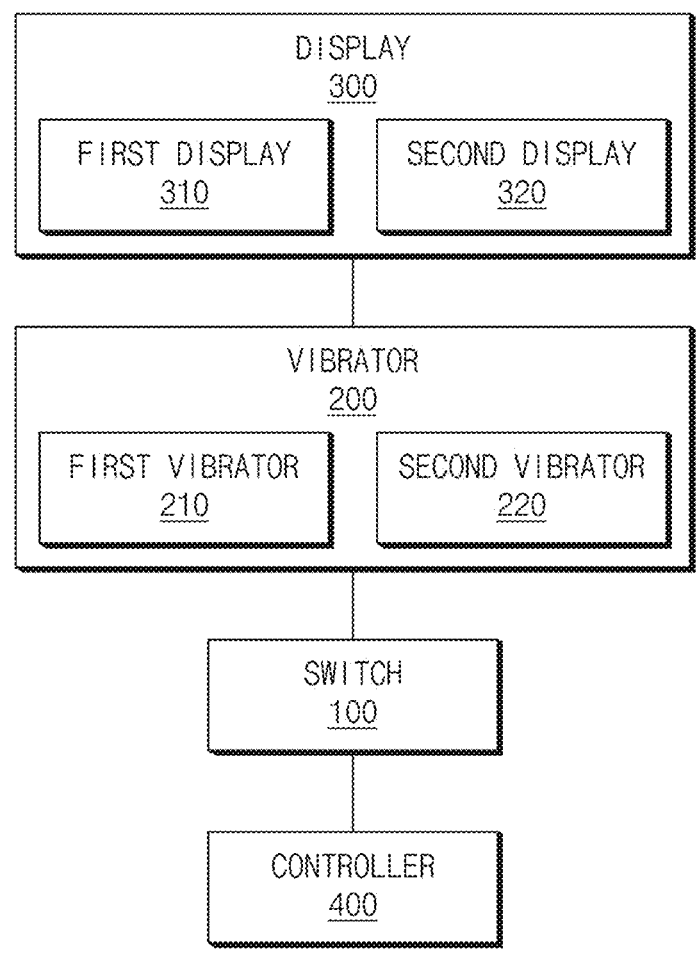
FIG. 1 is a block diagram illustrating a configuration of a multi-functional manipulation apparatus of a vehicle according to an embodiment of the present disclosure.

Hereinafter, some embodiments of the present disclosure are described in detail with reference to the accompanying drawings. In adding the reference numerals to the components of each drawing, it should be noted that identical components are designated by identical numerals even when they are displayed on other drawings. Further, in describing embodiments of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which the present disclosure belongs. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to FIGS. 1-17.

Figure 2:
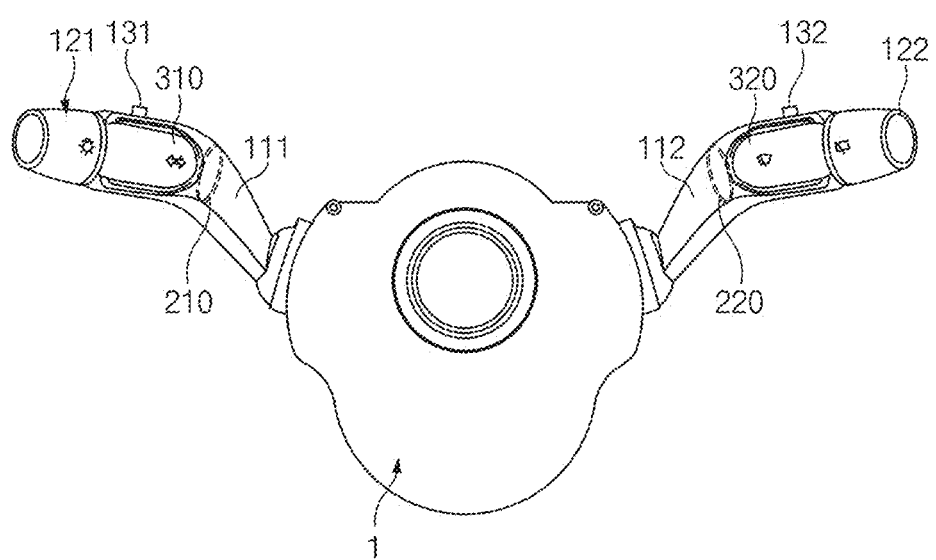
FIG. 2 is a drawing illustrating an embodiment of a multi-functional manipulation apparatus of a vehicle according to an embodiment of the present disclosure.

FIG. 1 is a block diagram illustrating a configuration of a multi-functional manipulation apparatus of a vehicle according to an embodiment of the present disclosure. FIG. 2 is a drawing illustrating an embodiment of a multi-functional manipulation apparatus of a vehicle according to an embodiment of the present disclosure.

Referring to FIGS. 1 and 2, a multi-functional manipulation apparatus 10 of a vehicle according to an embodiment of the present disclosure may be implemented inside the vehicle and may be coupled to a body part 1 that is loaded with or includes a steering angle sensor (SAS).

The multi-functional manipulation apparatus 10 of the vehicle may include a switch 100, a vibrator 200, a display 300, and a controller 400.

The switch 100 may be configured to control a vehicle accessory device such as headlamps (including fog lamps) of the vehicle, windshield wipers, a rear wiper, intermittent wipers, or the like. The switch 100 may be implemented in the form of a first lever 111 connected with the body part 1, a first knob 121 coupled to an end of the first lever 111, a first protrusion switch 131 protruding from the first lever 111, a second lever 112, a second knob 122 coupled to an end of the second lever 112, and a second protrusion switch 132 protruding from the second lever 112.

The switch 100 according to an embodiment may be implemented in a self-return scheme to operate and rotate by an external force and to return to a neutral position when the external force is removed.

The vibrator 200 may be coupled to one of the switches 100. For example, the vibrator 200 may be loaded into the first lever 111 or the second lever 112 or may be coupled to an end of the first knob 121 or the second knob 122. FIG. 2 illustrates an embodiment of a first vibrator 210 loaded into the first lever 111 and a second vibrator 220 loaded into the second lever 112.

The vibrator 200 may vibrate based on a control signal generated by the controller 400 depending on the operation of the switch 100. The vibrator 200 may operate in a different vibration mode depending on an operation direction or a rotation direction of the switch 100. According to an embodiment, the vibrator 200 may operate in a first vibration mode, when the switch 100 operates or rotates in a first direction, and may operate in a second vibration mode, when the switch 100 operates or rotates in a second direction. The first vibration mode and the second vibration mode may be set to differ in vibration magnitude from each other. Alternatively, the first vibration mode and the second vibration mode may be set to differ in vibration pattern from each other.

The vibrator 200 may correspond to the operation of the switch 100 to assign a haptic effect to a driver. Thus, although the driver does not visually identify the multi-functional manipulation apparatus 10, he or she may identify whether the multi-functional manipulation apparatus 10 operates. Furthermore, because the vibrator 200 differs in vibration pattern depending on an operation direction, the driver may more accurately recognize an operation state.

The display 300 may be coupled to the switch 100 or may be formed in a housing of the switch 100 to display an operation state of an accessory device under control of the controller 400.

The controller 400 may generate a control signal for controlling the accessory device depending on the operation of the switch 100. The controller 400 may differently set an order in which an operation mode of the accessory device is changed, depending on the operation direction or the rotation direction of the switch 100. For example, when the accessory device corresponding to any switch 100 operates in three operation modes such as mode A, mode B, and mode C, the controller 400 may change an operation mode in an order of mode A, mode B, and mode C in response to the switch 100 being operated in the first direction. Alternatively, the controller 400 may change the operation mode in an order of mode C, mode B, and mode A in response to the switch 100 being operated in the second direction.

Furthermore, the controller 400 according to an embodiment may control the vibrator 200 depending on the operation of the switch 100. The controller 400 may control the vibrator 200 in the first vibration mode or the second vibration mode, depending on the operation direction of the switch 100.

Furthermore, the controller 400 according to an embodiment may control the display 300 displaying the operation state of the accessory device, depending on the operation of the switch 100. To this end, the controller 400 may generate image data for displaying an operation state of the accessory device corresponding to the switch 100, in response to the operation of the switch 100. For example, when the switch 100 controls high beams, the controller 400 may generate image data for displaying an icon, which notifies a driver of an operation state of the high beams on the display 300 in response to the operation of the switch 100. As such, according to an embodiment of the present disclosure, because the operation state of the multi-functional manipulation apparatus 10 is displayed on the display 300, there is no need to engrave or print the symbol displaying the operation state of the accessory device into or on the switch 100. Thus, although a type or a function of the accessory device varies among vehicle models, there is no need to separately manufacture the multi-functional manipulation apparatus 10.

FIGS. 1 and 2 illustrate an embodiment of a first display 310 coupled to the first level 111 and a second display 320 coupled to the second lever 112.

Figure 3:
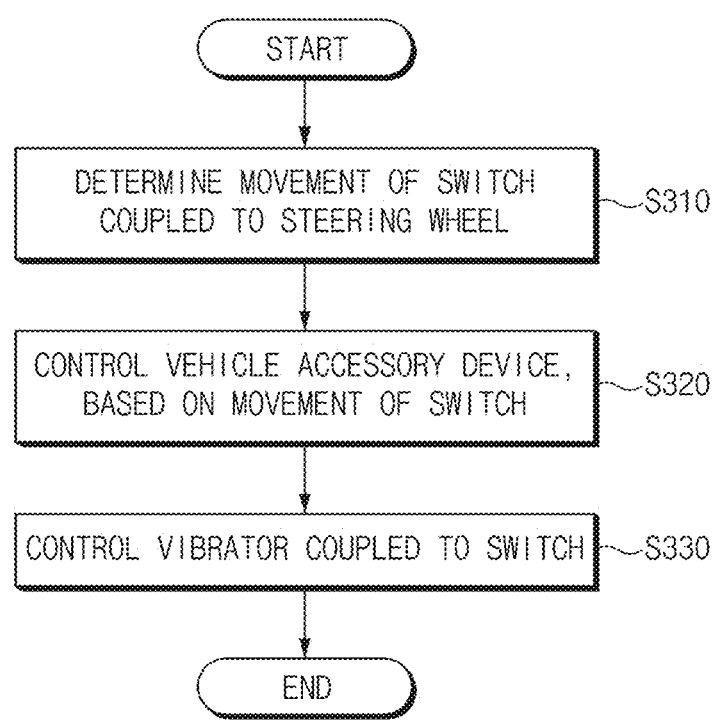
FIG. 3 is a flowchart illustrating a control method of a multi-functional manipulation apparatus according to an embodiment of the present disclosure.

FIG. 3 is a flowchart illustrating a control method of a multi-functional manipulation apparatus according to an embodiment of the present disclosure.

Referring to FIG. 3, in S310 in the control method of the multi-functional manipulation apparatus according to an embodiment of the present disclosure, a controller 400 of FIG. 1 may determine an operation of a switch 100 of FIG. 1.

The operation of the switch 100 may be divided into a first direction or a second direction. The switch 100 may return to a neutral position in a self-return scheme. The controller 400 may separate or identify a state before the switch 100 returns to the neutral position from a state where the switch 100 returns to the neutral position to determine the operation of the switch 100.

In S320, the controller 400 may control a vehicle accessory device corresponding to the switch 100, based on the operation of the switch 100. To this end, the controller 400 may generate a control signal based on the operation of the switch 100.

According to an embodiment, the controller 400 may generate a first control signal in response to the switch 100 being moved in the first direction or the second direction from the neutral position and may generate a second control signal in response to the switch 100 returning to the neutral position. The first control signal and the second control signal may control an operation of the accessory device differently.

According to another embodiment, the controller 400 may generate a third control signal in response to the switch 100 returning to the neutral position and may maintain an operation state of the accessory device by the third control signal, when the switch 100 returns to the neutral position. The third control signal may be to change an operation state of the accessory device whenever the operation of the switch 100 is detected. In other words, the operation state of the switch 100 may be changed among different, selectable, operation state options.

In S330, the controller 400 may control a vibrator coupled to the switch 100, under control of the vehicle accessory device.

The controller 400 may vibrate the vibrator 200 at a timing when the switch 100 moves from the neutral position and a timing when the switch 100 returns to the neutral position.

Alternatively, the controller 400 may vibrate the vibrator 200 at a timing when the switch 100 moves from the neutral position and may not vibrate the vibrator 200 at a timing when the switch 100 returns to the neutral position.

The controller 400 may set a vibration pattern of the vibrator 200 differently depending on a movement direction of the switch 100.

Hereinafter, a description of the operation of the multi-functional manipulation apparatus is given according to an embodiment of the present disclosure. A description of the operation of the multi-functional manipulation apparatus according to various embodiments is given in conjunction with FIGS. 1 and 2.

Figure 4:
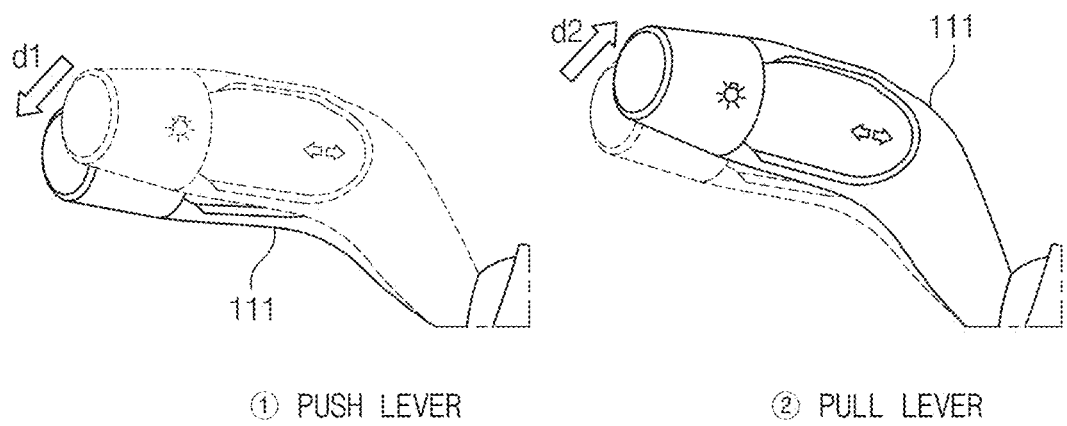
FIG. 4 is a drawing illustrating a first lever.
Figure 5:
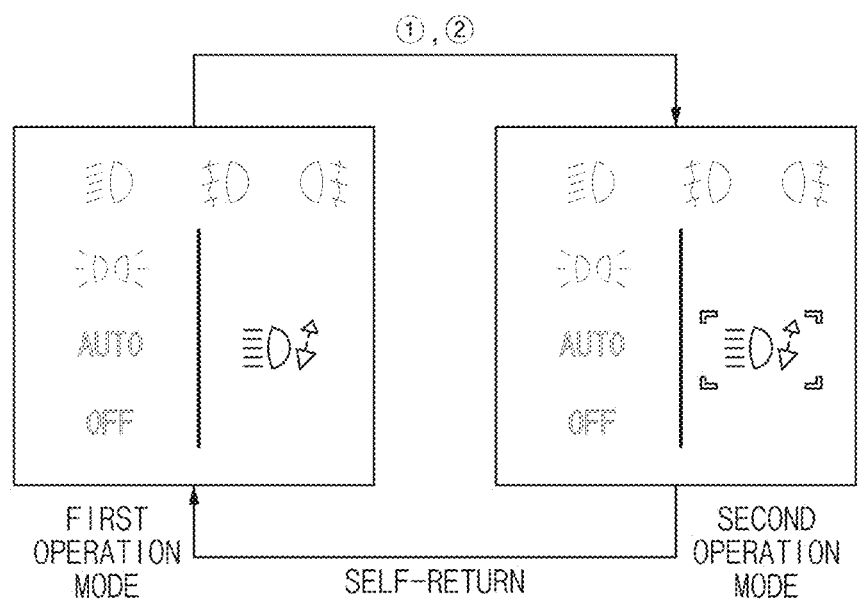
FIG. 5 is a drawing illustrating an operation state indication of a first lever.

FIGS. 4 and 5 are drawings describing an embodiment where a switch corresponds to a first lever. FIG. 4 is a drawing illustrating a first lever. FIG. 5 is a drawing illustrating an operation state indication of a first lever.

Referring to FIG. 4, a first lever 111 may be connected with a body part 1 of FIG. 2 to control an operation of high-beams of headlamps. The first lever 111 may operate in direction d1 or d2 by an external force. Direction d1 may be a push operation and direction d2 may be a pull operation. As the external force is removed, the first lever 111 may return to a neutral position in a self-return scheme.

Referring to FIG. 5, a controller 400 of FIG. 1 may change an operation mode of the first lever 111 to a first operation mode or a second operation mode in response to the first lever 111 being operated in direction d1 or d2. The first operation mode may be a state in which the high beams are off and the second operation mode may be a state where the high beams are on.

Furthermore, the controller 400 may generate image data for being displayed on a display 300 of FIG. 1, which displays an operation state of the high beams, in response to the first lever 111 being operated in direction d1 or d2. The controller 400 may display the operation state of the high beams on the display 300, based on the image data. In other words, in the state where the controller 400 is in the first operation mode, the controller 400 may generate image data for notifying a driver that the high beams are turned on, in response to the first lever 111 being operated in direction d1 or d2. Furthermore, in the state where the controller 400 is in the second operation mode, the controller 400 may generate image data for notifying the driver that the high beams are turned off, in response to the first lever 111 returning to the neutral position.

Furthermore, the controller 400 may vibrate a first vibrator 210 of FIG. 1 depending on the operation of the first lever 111. According to an embodiment, the controller 400 may control a vibration mode of the first vibrator 210 differently depending on the operation direction of the first lever 111. The vibration mode may be classified as a first vibration mode or a second vibration mode. The first vibration mode and the second vibration mode may differ in vibration magnitude from each other or may differ in vibration pattern or vibration time from each other.

The controller 400 may operate the first vibrator 210 in the first vibration mode, when the first lever 111 is operated in direction d1 and may operate the first vibrator 210 in the second vibration mode, when a second lever 112 of FIG. 2 is operated in direction d2.

Figure 6A:
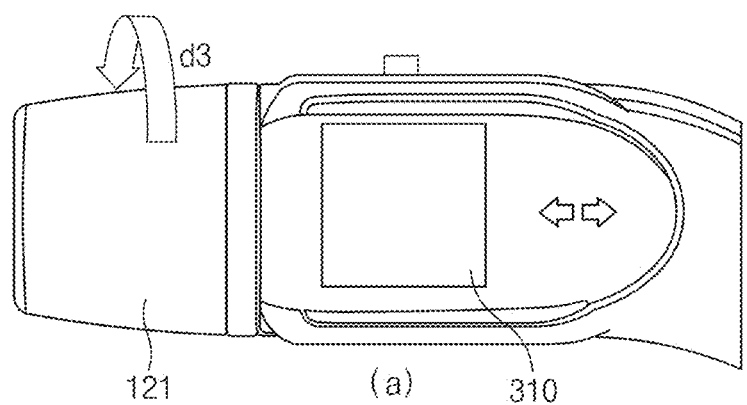
FIGS. 6A, 6B, and 6C are drawings illustrating operation states of a first knob.
Figure 6B:
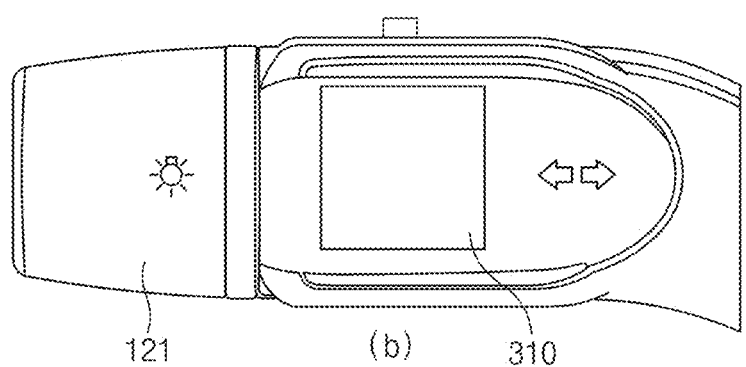
Figure 6C:
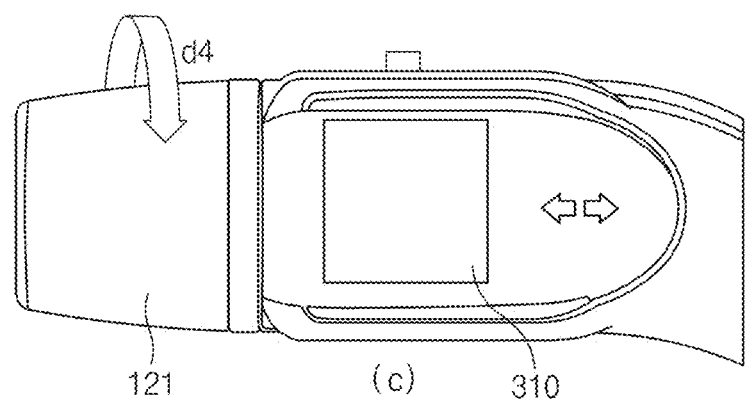
Figure 7:
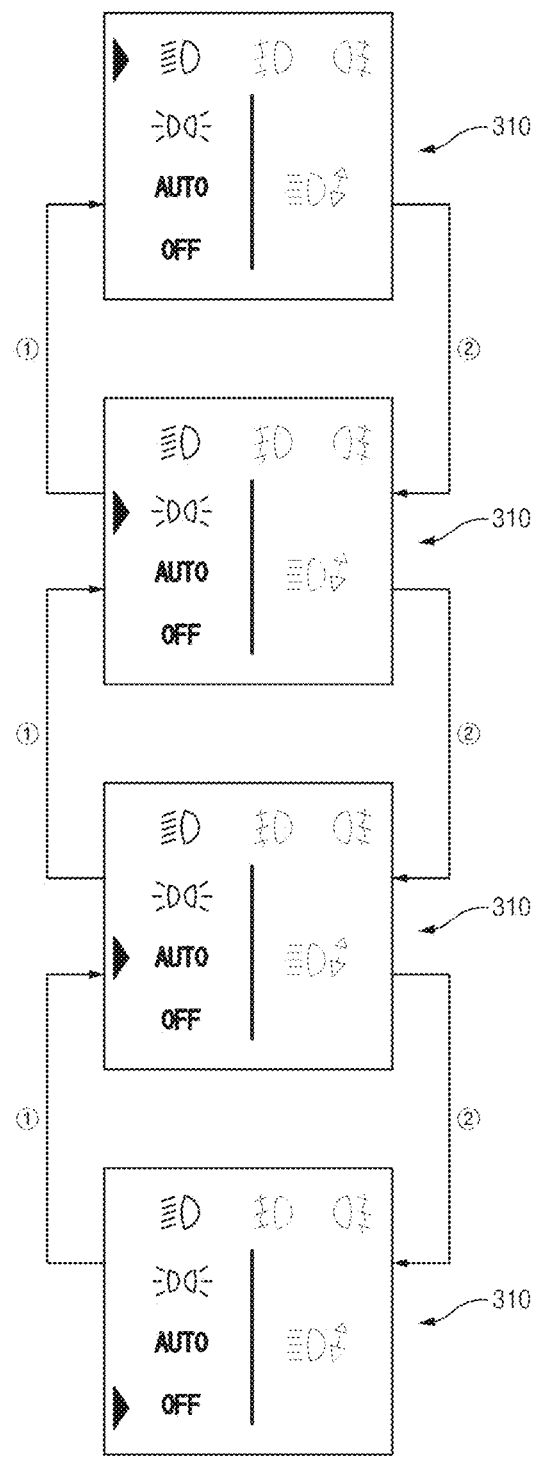
FIG. 7 is a drawing illustrating an embodiment in which a display displays an image depending on an operation state of a first knob.

FIGS. 6A-7 are drawings describing an embodiment where a switch corresponds to a first knob. FIGS. 6A-6C are drawings illustrating operation states of a first knob. FIG. 7 is a drawing illustrating an embodiment in which a display displays an image depending on an operation state of a first knob.

Referring to FIGS. 6A-6C, a first knob 121 may be coupled to an end of a first lever 111 of FIG. 2 to control an operation of headlamps. The knob 121 may rotate in direction d3 or d4 by an external force.

When there is no external force, the first knob 121 may maintain a neutral position as shown in FIG. 6B. The first knob 121 may rotate in direction d3 in a state shown in FIG. 6A by an external force. When the external force is removed, the first knob 121 may perform self-return to the neutral position. Furthermore, the first knob 121 may rotate in direction d4 in a state shown in FIG. 6C by an external force. When the external force is removed, the first knob 121 may perform self-return to the neutral position.

Referring to FIG. 7, a controller 400 of FIG. 1 may change an operation mode of the headlamps, in response to the first knob 121 being operated in direction d3 or d4.

Furthermore, the controller 400 may generate image data for displaying an operation state of the headlamps on a display 300 of FIG. 1, in response to the operation mode of the headlamps being changed. In other words, the controller 400 may generate image data for displaying an operation state of the headlamps on the display 300, in response to the first knob 121 being operated in direction d3 or d4.

The operation mode of the headlamps may include operation modes such as LOW, TAIL, AUTO, and OFF. The controller 400 may differently set an order where the operation mode of the headlamps is changed, depending on the operation direction of the first knob 121. For example, when the first knob 121 rotates in direction d3, the controller 400 may change the operation mode to an order of LOW, TAIL, AUTO, and OFF. Alternatively, when the first knob 121 rotates in direction d4, the controller 400 may change the operation mode to an order of OFF, AUTO, TAIL, and LOW.

Furthermore, the controller 400 may vibrate a first vibrator 210 of FIG. 1 depending on the operation of the first knob 121. According to an embodiment, the controller 400 may control a vibration mode of a vibrator 200 of FIG. 1 differently depending on the operation direction of the first knob 121.

The controller 400 may operate the first vibrator 210 in a first vibration mode, when the first knob 121 rotates in direction d3, and may operate the first vibrator 210 in a second vibration mode, when the first knob 121 rotates in direction d4.

Figure 8A:
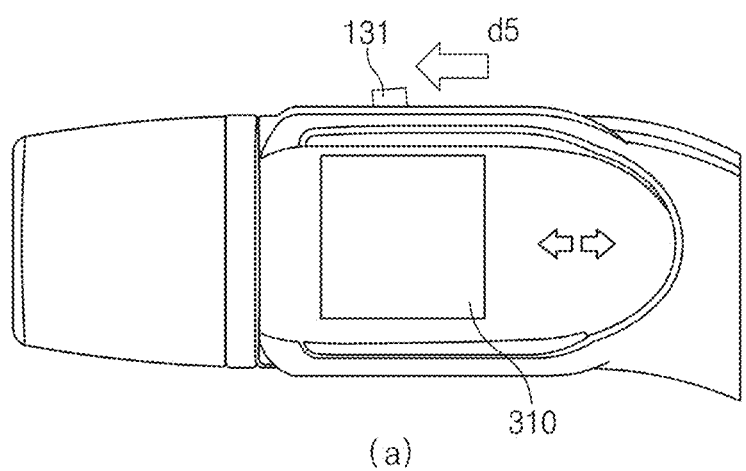
FIGS. 8A, 8B, and 8C are drawings illustrating a first protrusion switch.
Figure 8B:
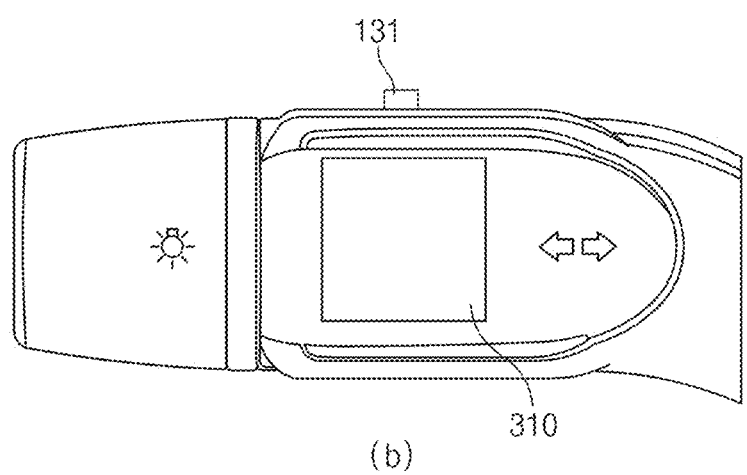
Figure 8C:
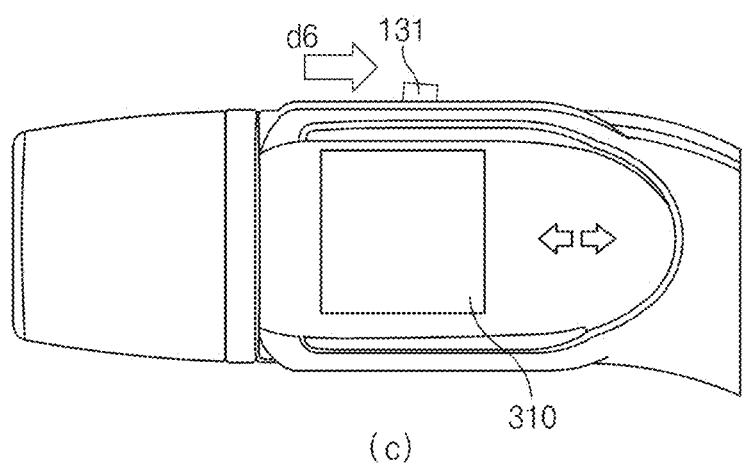
Figure 9:
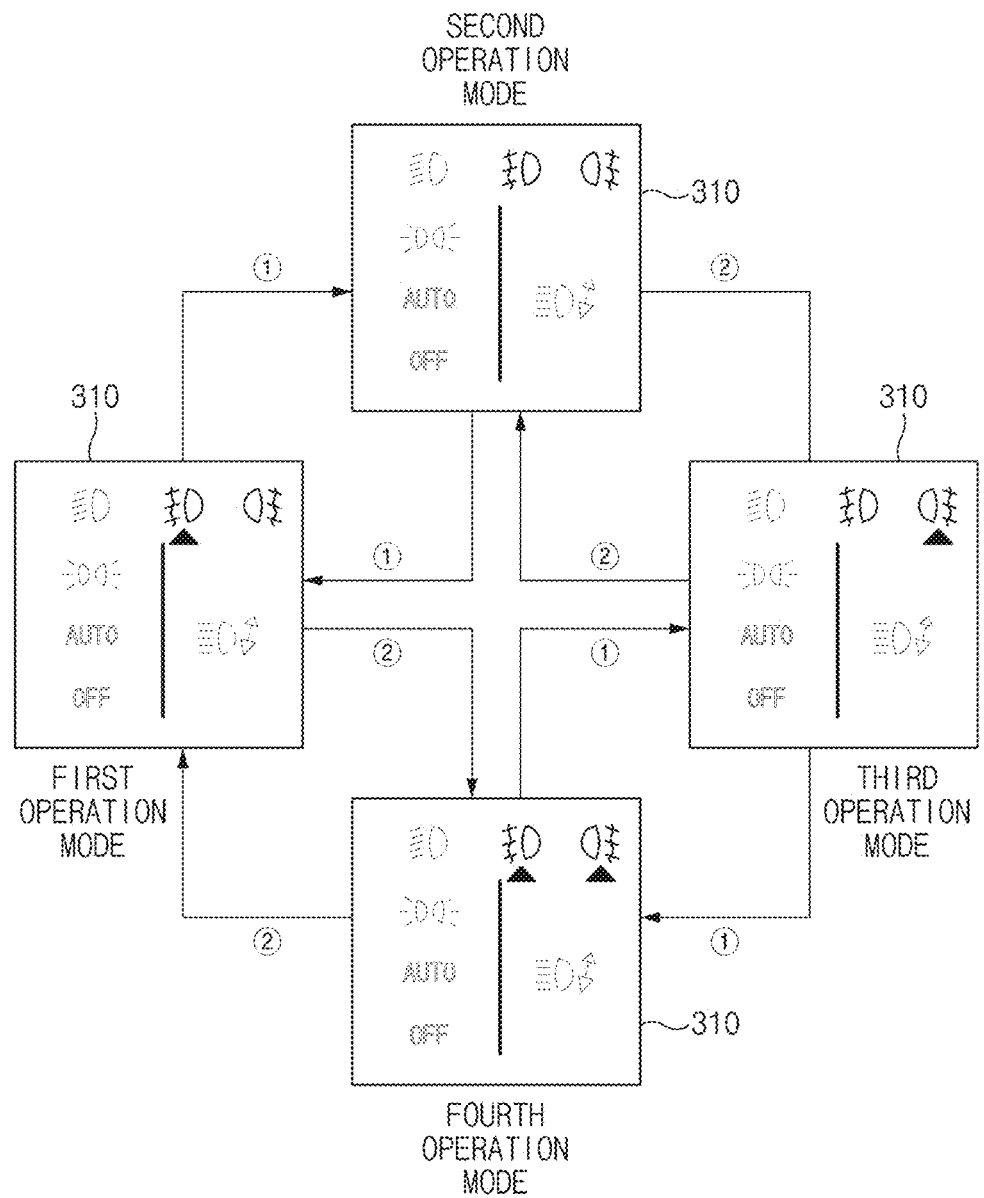
FIGS. 9, 10A, and 10B are drawings illustrating an embodiment of displaying an operation state of a first protrusion switch.
Figure 10A:
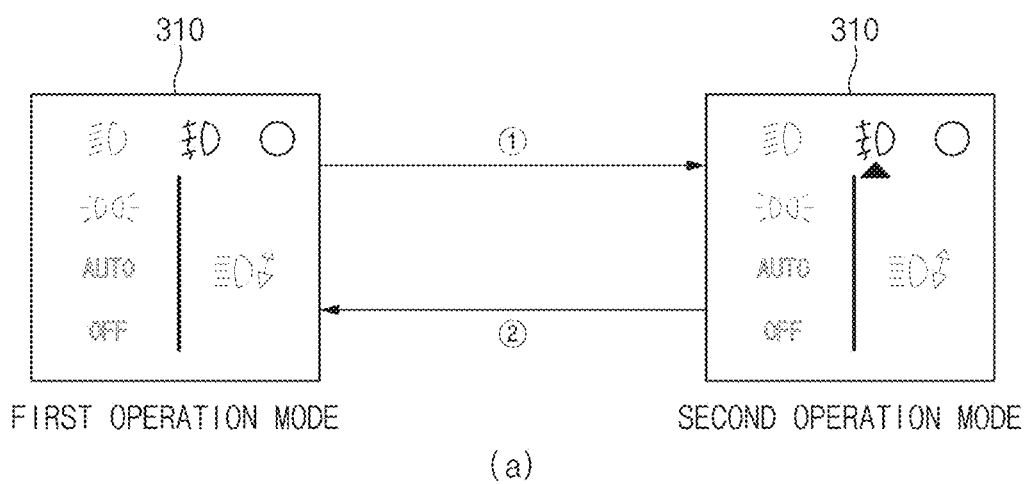
Figure 10B:
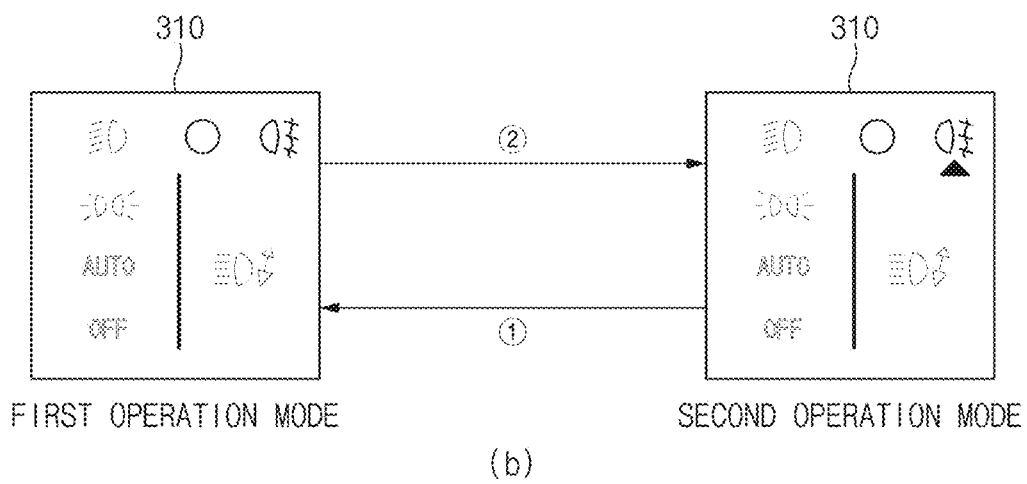

FIGS. 8A-10B are drawings describing an embodiment in which a switch corresponds to a first protrusion switch. FIGS. 8A-8C are drawings illustrating a first protrusion switch. FIGS. 9-10B are drawings illustrating an embodiment of displaying an operation state of a first protrusion switch. Particularly, FIG. 9 is a drawing illustrating an embodiment in which a display displays an image depending on an operation state, when there are front fog lamps and rear fog lamps. FIGS. 10A and 10B are drawings illustrating an embodiment in which a display displays an image depending on an operation state, when either front fog lamps or rear fog lamps are present.

Referring to FIGS. 8A-8C, a first protrusion switch 131 may be coupled to an end of a first knob 121 of FIG. 2 to control an operation of fog lamps.

When there is no external force, the first protrusion switch 131 may maintain a neutral position as shown in FIG. 8B. The first protrusion switch 131 may operate in direction d5 in a state shown in FIG. 8A by an external force. When the external force is removed, the first protrusion switch 131 may perform self-return to the neutral position. Furthermore, the first protrusion switch 131 may operate in direction d6 in a state shown in FIG. 8C by an external force. When the external force is removed, the first protrusion switch 131 may perform self-return to the neutral position.

A controller 400 of FIG. 1 may change an operation mode of the front fog lamps and the rear fog lamps, in response to the first protrusion switch 131 being operated in direction d5 or d6.

Referring to FIG. 9, when the vehicle includes both front fog lamps and the rear fog lamps, the operation mode of the fog lamps may include first to fourth operation modes. The first operation mode may be a state in which the front fog lamps operate, and the rear fog lamps do not operate. The second operation mode may be a state in which the front fog lamps do not operate, and the rear fog lamps do not operate. The third operation mode may be a state in which the front fog lamps do not operate, and the rear fog lamps operate. The fourth operation mode may be a state in which both the front fog lamps and the rear fog lamps operate.

Whenever the first protrusion switch 131 operates in direction d5, the controller 400 may switch the first operation mode and the second operation mode or may switch the third operation mode and the fourth operation mode. Alternatively, whenever the first protrusion switch 131 operates in direction d6, the controller 400 may switch the second operation mode and the third operation mode or may switch the first operation mode and the fourth operation mode.

Furthermore, the controller 400 may generate image data for displaying an operation state of the fog lamps on a display 300 of FIG. 1, in response to the operation mode of the fog lamps being changed. In other words, the controller 400 may generate image data for displaying an operation state of the fog lamps on the display 300, in response to the first protrusion switch 131 being operated in direction d5 or d6.

The controller 400 may display an operation mode of the front fog lamps, in response to the first protrusion switch 131 being operated in direction d5. For example, the controller 400 may alternately generate image data for notifying a driver that the front fog lamps are turned on and image data for notifying the driver that the front fog lamps are turned off, in response to the first protrusion switch 131 being operated in direction d5. Furthermore, the controller 400 may alternately generate image data for notifying the driver that the rear fog lamps are turned on and image data for notifying the driver that the rear fog lamps are turned off, in response to the first protrusion switch 131 being operated in direction d6.

Furthermore, the controller 400 may vibrate a first vibrator 210 of FIG. 1 depending on the operation of the first protrusion switch 131. The controller 400 may operate the first vibrator 210 in a first vibration mode, when the first protrusion switch 131 rotates or moves in direction d5 and may operate the first vibrator 210 in a second vibration mode, when the first protrusion switch 131 rotates or moves in direction d6.

Referring to FIGS. 10A and 10B, when the vehicle includes only the front fog lamps or the rear fog lamps, the operation mode of the fog lamps may include first and second operation modes.

As shown in FIG. 10A, when there are the front fog lamps, the first operation mode may be a state in which the front fog lamps operate, and the second operation mode may be a state where the front fog lamps do not operate.

The controller 400 may activate fog lamps, for example, the front fog lamps, in response to the first protrusion switch 131 being operated in direction d5. Furthermore, the controller 400 may deactivate the front fog lamps, in response to the first protrusion switch 131 being operated in direction d6.

Furthermore, the controller 400 may generate image data for displaying an operation state of the fog lamps on the display 300, in response to the operation mode of the fog lamps being changed. In other words, the controller 400 may display an image for notifying a driver of an active state of the front fog lamps on the display 300, in response to the first protrusion switch 131 being operated in direction d5. Alternatively, the controller 400 may display an image for notifying the driver of an inactive state of the front fog lamps on the display 300, in response to the first protrusion switch 131 being operated in direction d6.

Alternatively, as shown in FIG. 10B, when there are only the rear fog lamps, the first operation mode may be a state in which the rear fog lamps operate, and the second operation mode may be a state in which the rear fog lamps do not operate.

The controller 400 may activate fog lamps, for example, the rear fog lamps, in response to the first protrusion switch 131 being operated in direction d6. Furthermore, the controller 400 may deactivate the rear fog lamps, in response to the first protrusion switch 131 being operated in direction d5.

Furthermore, the controller 400 may generate image data for displaying an operation state of the fog lamps on the display 300, in response to the operation mode of the fog lamps being changed. In other words, the controller 400 may display an image for notifying the driver of an active state of the rear fog lamps on the display 300, in response to the first protrusion switch 131 being operated in direction d6. Alternatively, the controller 400 may display an image for notifying the driver of an inactive state of the rear fog lamps, in response to the first protrusion switch 131 being operated in direction d5.

Furthermore, the controller 400 may vibrate the first vibrator 210 depending on the operation of the first protrusion switch 131.

According to an embodiment, the controller 400 may control a vibration mode of the first vibrator 210 differently depending on the operation direction of the first protrusion switch 131. For example, the controller 400 may operate the first vibrator 210 in the first vibration mode, when a first lever 111 of FIG. 2 rotates in direction d5 and may operate the first vibrator 210 in the second vibration mode, when a second lever 112 of FIG. 2 operates in direction d6.

According to another embodiment, the controller 400 may control a vibration mode of the first vibrator 210 differently depending on the activation or deactivation of the fog lamps. For example, the controller 400 may operate the first vibrator 210 in the first vibration mode, in response to an operation where the front fog lamps or the rear fog lamps are activated and may operate the first vibrator 210 in the second vibration mode, in response to an operation where the front fog lamps or the rear fog lamps are deactivated.

Figure 11:
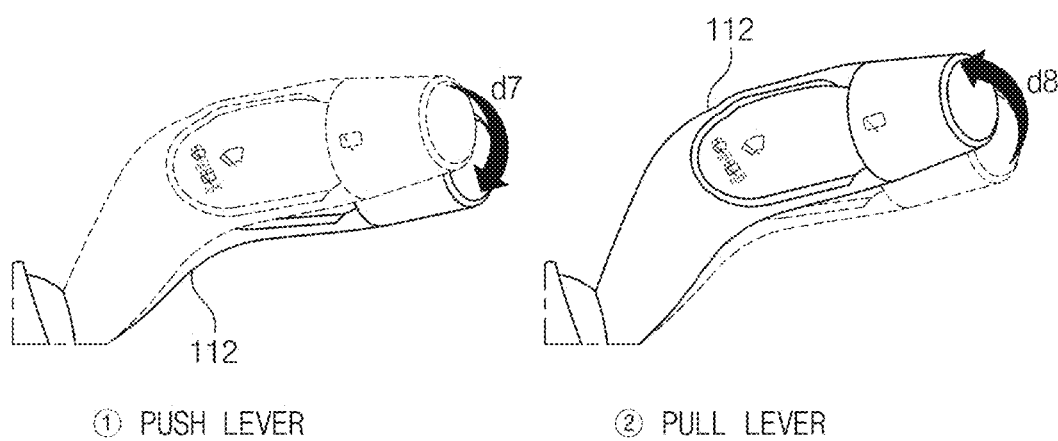
FIG. 11 is a drawing illustrating a second lever.
Figure 12:
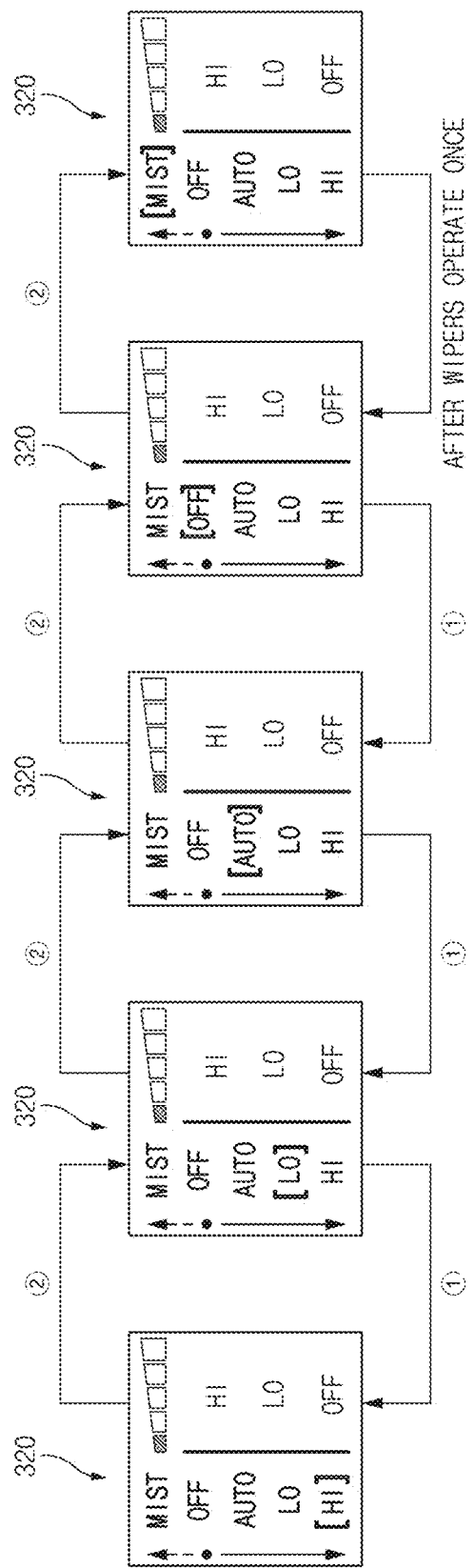
FIG. 12 is a drawing illustrating an operation state indication of a second lever.

FIGS. 11 and 12 are drawings illustrating an embodiment in which a switch corresponds to a second lever. FIG. 11 is a drawing illustrating a second lever. FIG. 12 is a drawing illustrating an operation state indication of a second lever.

Referring to FIG. 11, a second lever 112 may be connected with a body part 2 of FIG. 2 to control an operation of one or more wipers, such as the windshield wipers, a rear wiper, or the like. The second lever 112 may operate in direction d7 or d8 by an external force. Direction d7 may be an operation by a push operation, and direction d8 may be an operation by a pull operation. As the external force is removed, the second lever 112 may return to a neutral position in a self-return scheme.

Referring to FIG. 12, a controller 400 of FIG. 1 may generate image data for displaying an operation state of the wipers on a display 300 of FIG. 1, in response to the second lever 112 being operated in direction d7 or d8.

The operation mode of the wipers may include operation modes such as HI, LO, AUTO, OFF, and MIST. After operating once, the operation mode MIST may enter the operation mode OFF although there is no additional manipulation of the second lever 112.

The controller 400 may differently set an order in which an operation mode of headlamps is changed, depending on the operation direction of the second lever 112. For example, when the second lever 112 rotates in direction d7, the controller 400 may change the operation mode to an order of OFF, AUTO, LO, and HI.

Alternatively, when the second lever 112 rotates in direction d8, the controller 400 may change the operation mode to an order of HI, LO, AUTO, OFF, and MIST.

Furthermore, the controller 400 may vibrate a second vibrator 220 of FIG. 1 depending on the operation of the second lever 112. According to an embodiment, the controller 400 may control a vibration mode of the second vibrator 220 differently depending on the operation direction of the second lever 112.

The controller 400 may operate the second vibrator 220 in a first vibration mode, when the second lever 112 rotates in direction d7 and may operate the second vibrator 220 in a second vibration mode, when the second lever 112 rotates in direction d8.

Figure 13A:
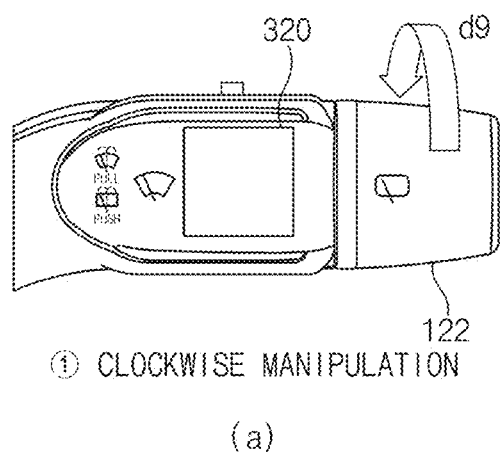
FIGS. 13A and 13B are drawings illustrating operation states of a second knob.
Figure 13B:
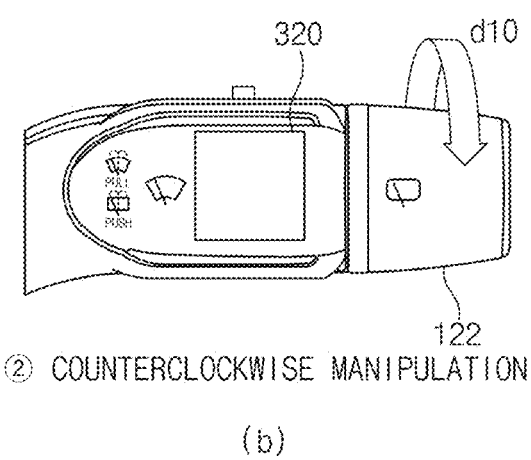
Figure 14:
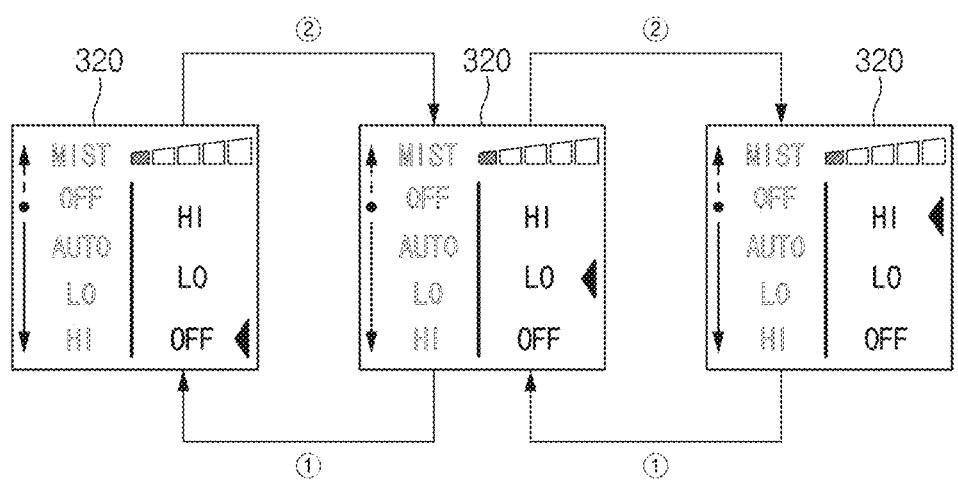
FIG. 14 is a drawing illustrating an embodiment in which a display displays an image depending on an operation state of a second knob.

FIGS. 13A-14 are drawings illustrating an embodiment in which a switch corresponds to a second knob. FIGS. 13A and 13B are drawings illustrating operation states of a second knob. FIG. 14 is a drawing illustrating an embodiment in which a display displays an image depending on an operation state of a second knob.

Referring to FIGS. 13A and 13B, a second knob 122 may be coupled to an end of a second lever 112 of FIG. 2 to control an operation of a rear wiper. The second knob 122 may include an operation where it rotates in direction d9 or d10 by an external force.

When there is no external force, the second knob 122 may maintain a neutral position. The second knob 122 may rotate in direction d9 in a state shown in FIG. 13A by an external force. When the external force is removed, the second knob 122 may perform self-return to the neutral position. Furthermore, the second knob 122 may rotate in direction d10 in a state shown in FIG. 13B by an external force. When the external force is removed, the second knob 122 may perform self-return to the neutral position.

Referring to FIG. 14, a controller 400 of FIG. 1 may change an operation mode of the rear wiper, in response to the second knob 122 being operated in direction d9 or d10.

Furthermore, the controller 400 may generate image data for displaying an operation state of the rear wiper on a display 300 of FIG. 1, in response to the operation mode of the rear wiper being changed. In other words, the controller 400 may generate image data for displaying an operation state of the rear wiper on the display 300, in response to the second knob 122 being operated in direction d9 or d10.

The operation mode of the rear wiper may include operation modes such as HI, LO, and OFF. The controller 400 may differently set an order in which the operation mode of the rear wiper is changed, depending on the operation direction of the second knob 122. For example, when the second knob 122 rotates in direction d9, the controller 400 may change the operation mode to an order of HI, LO, and OFF. Alternatively, when the second knob 122 rotates in direction d10, the controller 400 may change the operation mode to an order of OFF, LO, and HI.

Furthermore, the controller 400 may vibrate a second vibrator 220 of FIG. 1 depending on the operation of the second knob 122. According to an embodiment, the controller 400 may control a vibration mode of the second vibrator 220 differently depending on the operation direction of the second knob 122.

The controller 400 may operate the second vibrator 220 in a first vibration mode, when the second knob 122 rotates in direction d9 and may operate the second vibrator 220 in a second vibration mode, when the second knob 122 rotates in direction d10.

Figure 15A:
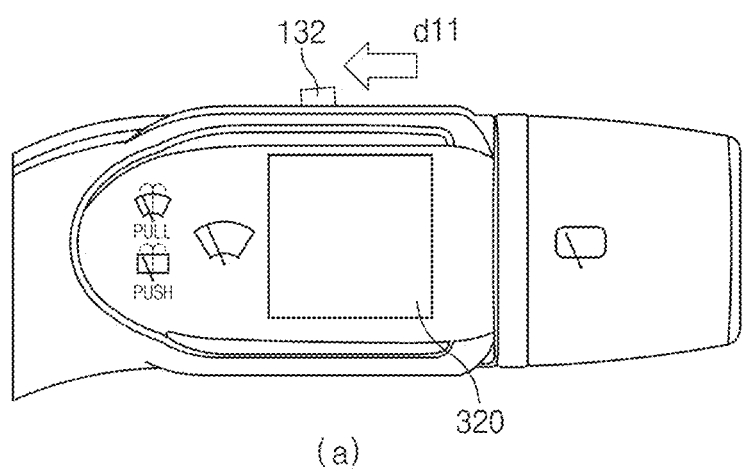
FIGS. 15A, 15B, and 15C are drawings illustrating a second protrusion switch.
Figure 15B:
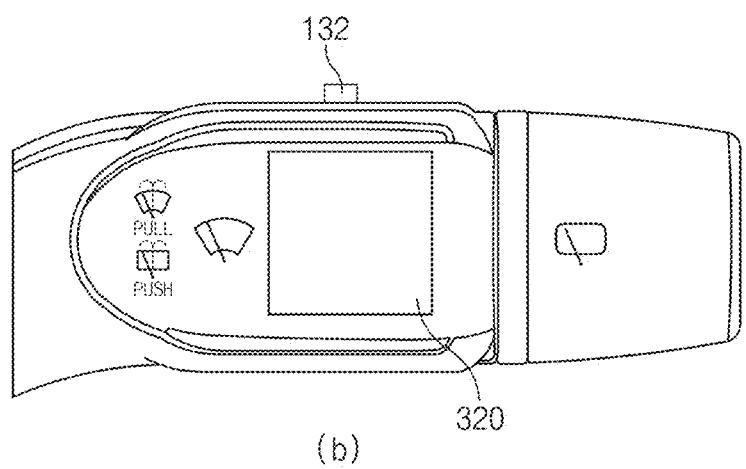
Figure 15C:
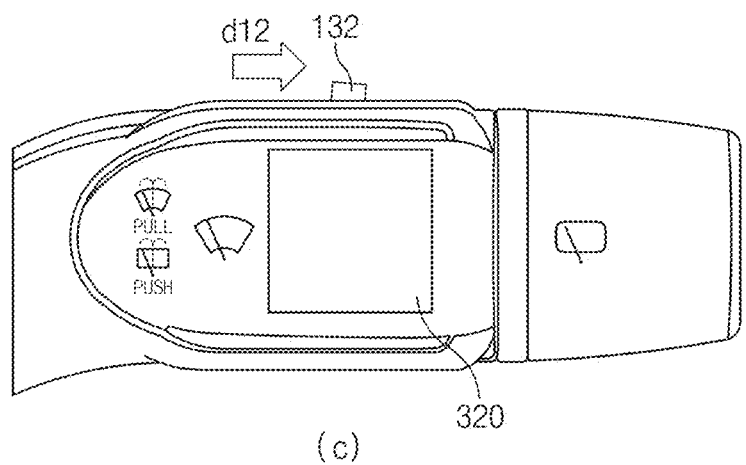
Figure 16:
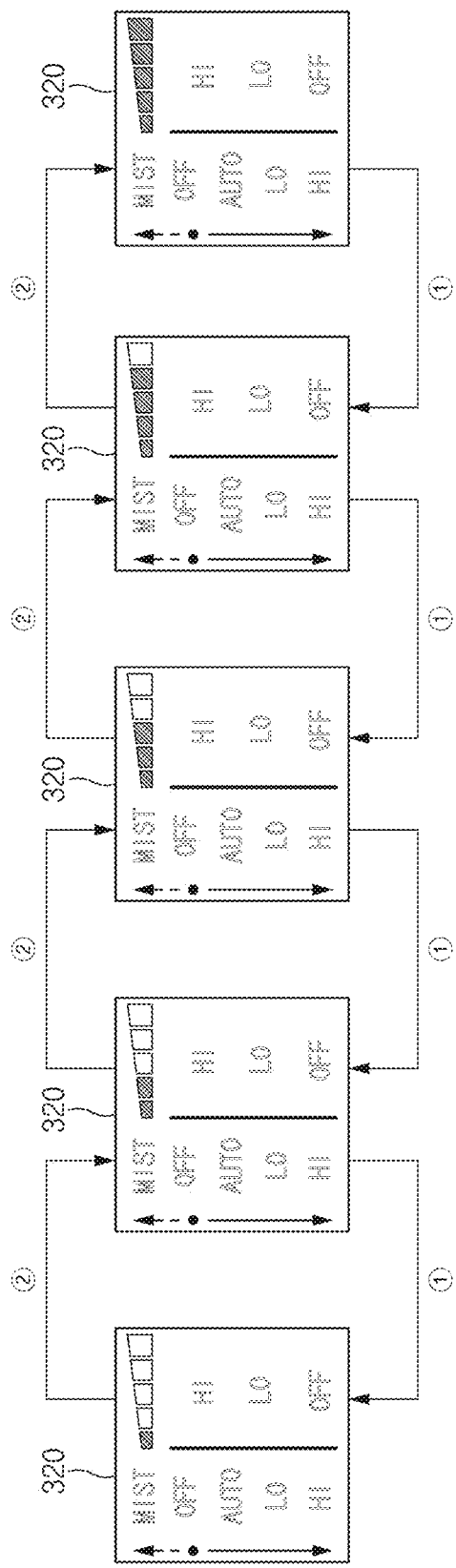
FIG. 16 is a drawing illustrating an embodiment of displaying an operation state of a second protrusion switch.

FIGS. 15A-16 are drawings illustrating an embodiment in which a switch corresponds to a second protrusion switch. FIGS. are drawings illustrating a second protrusion switch. FIG. 16 is a drawing illustrating an embodiment of displaying an operation state of a second protrusion switch.

Referring to FIGS. 15A-15C, a second protrusion switch 132 may be coupled to an end of a second knob 122 of FIG. 2 to control an interval of intermittent wipers.

When there is no external force, the second protrusion switch 132 may maintain a neutral position as shown in FIG. 15B. The second protrusion switch 132 may operate in direction d11 in a state shown in FIG. 15A by an external force. When the external force is removed, the second protrusion switch 132 may perform self-return to the neutral position. Furthermore, the second protrusion switch 132 may operate in direction d12 in a state shown in FIG. 15C by an external force. When the external force is removed, the second protrusion switch 132 may perform self-return to the neutral position.

Referring to FIG. 16, a controller 400 of FIG. 1 may control an interval of the intermittent wipers, in response to the second protrusion switch 132 being operated in direction d11 or d12.

Furthermore, the controller 400 may generate image data for displaying an operation state of the intermittent wipers on a display 300 of FIG. 1, in response to the interval of the intermittent wipers being changed. In other words, the controller 400 may generate image data for displaying an operation state of the intermittent wipers on the display 300, in response to the second protrusion switch 132 being operated in direction d11 or d12.

The operation mode of the intermittent wipers may include first to fifth stages. Each stage may be represented as an image as shown in FIG. 16.

The controller 400 may differently set an order in which an operation mode of the intermittent wipers is changed, depending on the rotation direction of the second protrusion switch 132. For example, when the second protrusion switch 132 operates in direction d11, the controller 400 may change the operation mode to gradually reduce the stage from the fifth stage to the first stage. Alternatively, when the second protrusion switch 132 operates in direction d12, the controller 400 may change the operation mode to gradually increase the stage from the first stage to the fifth stage.

Furthermore, the controller 400 may vibrate the second vibrator 220 depending on the operation of the second protrusion switch 132. According to an embodiment, the controller 400 may control a vibration mode of the second vibrator 220 differently depending on the operation direction of the second protrusion switch 132.

The controller 400 may operate the second vibrator 220 in a first vibration mode, when the second protrusion switch 132 operates in direction d11 and may operate the second vibrator 220 in a second vibration mode, when the second protrusion switch 132 operates in direction d12.

According to the above-mentioned embodiments, the controller 400 may control the display 300 to display icons different from a high-beam icon, which is for notifying a driver of an operation state of high beams and to display the high-beam icon at a higher luminance than another icon.

Furthermore, according to another embodiment, the controller 400 may control the display 300 to display only the high-beam icon on the display 300 and not to display other icons.

Figure 17:
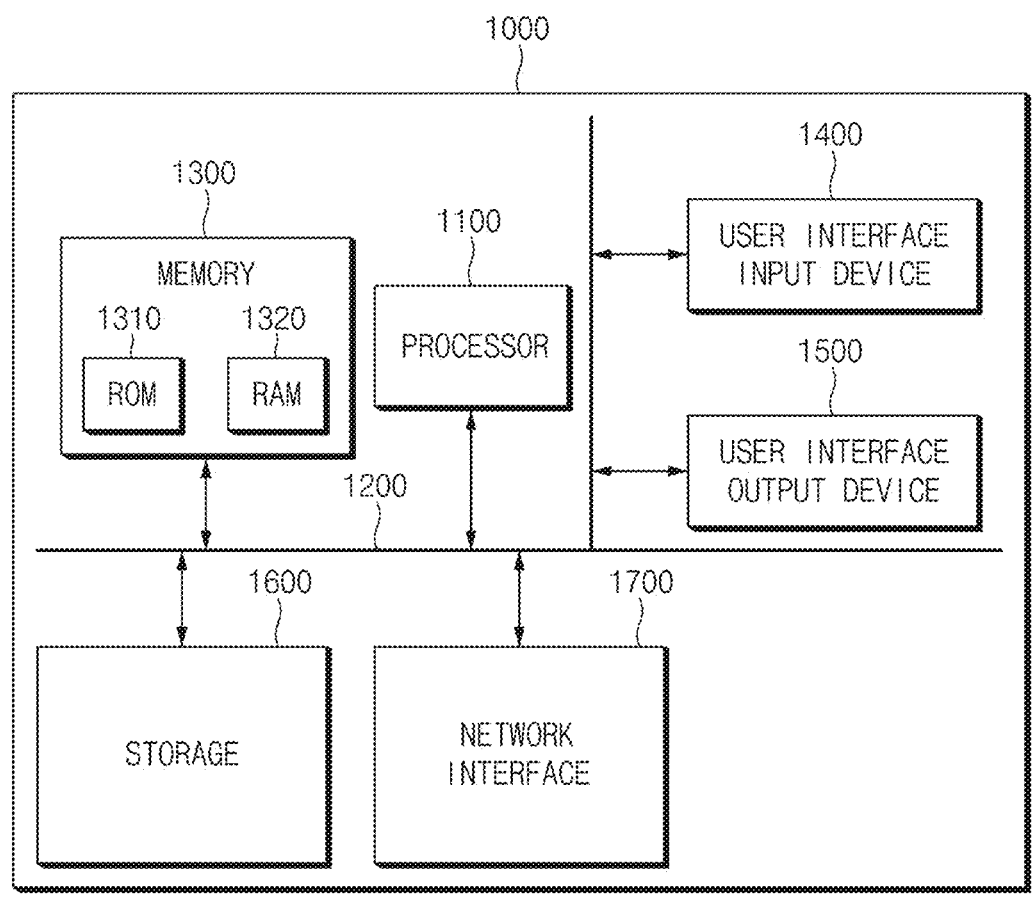
FIG. 17 is a block diagram illustrating a computing system according to an embodiment of the present disclosure.

FIG. 17 is a block diagram illustrating a computing system according to an embodiment of the present disclosure.

Referring to FIG. 17, a computing system 1000 may include at least one processor 1100, a memory 1300, a user interface input device 1400, a user interface output device 1500, a storage 1600, and a network interface 1700. These components are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or in a software module executed by the processor 1100, or in a combination thereof. The software module may reside on a storage medium (i.e., the memory 1300 and/or the storage 1600) such as a random access memory (RAM), a flash memory, a non-volatile read-only memory (ROM), an erasable programmable read-only memory (EPROM), an electrically erasable read-only memory (EEPROM), a register, a hard disc, a removable disk, and a compact disc read-only memory (CD-ROM).

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The multi-functional manipulation apparatus and the control method thereof according to embodiments of the present disclosure may display a manipulation state on a display. Thus, a driver may more easily identify an operation state of the multi-functional manipulation apparatus.

Furthermore, the multi-functional manipulation apparatus and the control method thereof according to embodiments of the present disclosure may apply a function of the multi-functional manipulation apparatus to another vehicle. This is because there is no need to print or engrave a symbol on or into the appearance of the multi-functional manipulation apparatus.

Furthermore, the multi-functional manipulation apparatus and the control method thereof according to embodiments of the present disclosure may allow a driver to more intuitively identify a vibration manipulation state depending on manipulation.

In addition, various effects ascertained directly or indirectly through the present disclosure may be provided.

Hereinabove, although the present disclosure has been described with reference to several embodiments and the accompanying drawings, the present disclosure is not limited thereto. The present disclosure may be variously modified and altered by those of ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them. Thus, the spirit and scope of the present disclosure is not limited by the embodiments. The scope of the present disclosure should be construed on the basis of the accompanying claims and all the technical ideas within the scope equivalent to the claims should be included in the scope of the present disclosure.

What is claimed is:

1. A multi-functional manipulation apparatus, comprising:
   a switch configured to operate by an external force from a neutral position and return to the neutral position when the external force is removed;
   a knob configured having the self-return scheme, the knob being coupled to an end of the switch to change an operation mode of headlamps or wipers;
   a vibrator coupled to the switch and configured to vibrate depending on an operation of the switch;
   a display configured to display an operation state of a vehicle accessory device depending on the operation of the switch; and
   a controller configured to:
   control the vehicle accessory device corresponding to the vibrator and the switch, in response to the operation of the switch; and
   differently set an order in which the operation mode of the headlamps is changed or an order in which the operation mode of the wipers is changed, the order being displayed on the display, depending on a rotation direction of the knob.

2. The multi-functional manipulation apparatus of claim 1, wherein the controller is configured to:
control the vibrator in a first vibration mode, based on that the switch operates in a first direction, and
control the vibrator in a second vibration mode, based on that the switch operates in a second direction.

3. The multi-functional manipulation apparatus of claim 2, wherein the controller is configured to adjust vibration magnitudes of the first vibration mode and the second vibration mode to be different.

4. The multi-functional manipulation apparatus of claim 2, wherein the controller is configured to adjust vibration patterns of the first vibration mode and the second vibration mode to be different.

5. The multi-functional manipulation apparatus of claim 1,
wherein the controller is configured to generate image data for notifying a driver of a vehicle of the operation state of the vehicle accessory device, in response to the operation of the switch.

6. The multi-functional manipulation apparatus of claim 5, wherein the switch is a lever configured having a self-return scheme,
wherein the lever is coupled to one side of a steering wheel of the vehicle to control an operation of the headlamps or the wipers, and
wherein the controller is configured to differently set an order in which an operation mode of the wipers is changed, the order being displayed on the display, in response to an operation of the lever.

7. The multi-functional manipulation apparatus of claim 6, wherein the knob is coupled to an end of the lever to change the operation mode of the headlamps or an operation mode of a rear wiper.

8. The multi-functional manipulation apparatus of claim 1, wherein the controller is configured to set a vibration mode of the vibrator differently, depending on the order in which the operation mode of the headlamps is changed or the order in which the operation mode of the wipers is changed, the order being displayed on the display.

9. The multi-functional manipulation apparatus of claim 6, further comprising a protrusion switch configured having the self-return scheme, the protrusion switch protruding from the lever to control an operation of fog lamps or intermittent wipers,
wherein the controller is configured to differently display an order in which an operation mode of the fog lamps is changed or an order in which an operation mode of the intermittent wipers is changed, the order being displayed on the display, depending on an operation direction of the protrusion switch.

10. The multi-functional manipulation apparatus of claim 9, wherein the controller is configured to set a vibration mode of the vibrator differently, depending on the order in which the operation mode of the fog lamps is changed or the order in which the operation mode of the intermittent wipers is changed, the order being displayed on the display.

11. A control method of a multi-functional manipulation apparatus, the control method comprising:
determining, by a controller, an operation of a switch coupled to a steering wheel of a vehicle;
controlling, by the controller, a vehicle accessory device corresponding to the switch, in response to the operation of the switch; and
controlling, by the controller, a vibrator coupled to the switch, under control of the vehicle accessory device,
wherein the controlling of the vibrator coupled to the switch includes:
setting a vibration mode of the vibrator differently, depending on an order in which an operation mode of headlamps is changed or an order in which an operation mode of wipers is changed, the order being displayed on a display of the multi-functional manipulation apparatus.

12. The control method of claim 11, wherein the controlling of the vibrator coupled to the switch includes:
controlling the vibrator in a first vibration mode, when the switch is operated in a first direction; and
controlling the vibrator in a second vibration mode, when the switch is operated in a second direction.

13. The control method of claim 12, wherein the controlling of the vibrator coupled to the switch includes:
adjusting vibration magnitudes of the first vibration mode and the second vibration mode to be different.

14. The control method of claim 12, wherein the controlling of the vibrator coupled to the switch includes:
adjusting vibration patterns of the first vibration mode and the second vibration mode to be different.

15. The control method of claim 11, further comprising:
generating image data for notifying a driver of the vehicle of an operation state of the vehicle accessory device, in response to the operation of the switch; and
displaying the operation state of the vehicle accessory device on the display of the multi-functional manipulation apparatus, based on the image data.

16. The control method of claim 15, wherein the displaying of the operation state of the vehicle accessory device on the display includes:
setting an order in which the operation mode of the wipers is changed, based on an operation of a lever coupled to one side of the steering wheel.

17. The control method of claim 16, wherein the displaying of the operation state of the vehicle accessory device on the display further includes:
setting the order in which the operation mode of the headlamps is changed or the order in which the operation mode of the wipers is changed, the order being displayed on the display, based on an operation of a knob coupled to an end of the lever.

18. The control method of claim 16, wherein the displaying of the operation state of the vehicle accessory device on the display includes:
differently displaying an order in which an operation mode of fog lamps is changed or an order in which an operation mode of intermittent wipers is changed, the order being displayed on the display, based on an operation of a protrusion switch coupled to the lever.

19. The control method of claim 18, wherein the controlling of the vibrator coupled to the switch includes:
differently setting the vibration mode of the vibrator, depending on the order in which the operation mode of the fog lamps is changed or the order in which the operation mode of the intermittent wipers is changed, the order being displayed on the display.

* * * * *